United States Patent [19]
Syré et al.

[11] Patent Number: 5,109,744
[45] Date of Patent: May 5, 1992

[54] BAND SAW FOR CUTTING ANIMAL CARCASSES

[75] Inventors: Manfred Syré; Reinhard Freund, both of Paderborn, Fed. Rep. of Germany

[73] Assignee: Reinhard Freund Maschinenbau, Fed. Rep. of Germany

[21] Appl. No.: 554,350

[22] Filed: Jul. 19, 1990

[51] Int. Cl.$^5$ ............................................. B23D 55/10
[52] U.S. Cl. ........................................ 83/818; 83/816; 83/814; 83/168
[58] Field of Search ................. 83/168, 814, 816, 818, 83/820, 805, 807, 810, 811

[56] References Cited

U.S. PATENT DOCUMENTS

| 2,423,363 | 7/1947 | Biro | 83/168 |
| 4,258,601 | 3/1981 | Tanabe | 83/820 |
| 4,926,733 | 5/1990 | Janson | 83/818 |

FOREIGN PATENT DOCUMENTS 3730730  3/1989  Fed. Rep. of Germany.

*Primary Examiner*—Frank T. Yost
*Assistant Examiner*—Allan M. Schrock
*Attorney, Agent, or Firm*—Laubscher Presta & Laubscher

[57] ABSTRACT

A band saw for cutting animal carcasses and the like includes a housing and a lid rotatably connected therewith for movement between open and closed positions. Within the housing are provided a pair of pulleys for supporting a cutting band. Guides are provided adjacent the pulleys to twist the band 90° to define a cutting segment thereof. Each guide includes a first guide member connected with the housing and a second guide member connected with the lid and defining a gap for receiving the band when the lid is closed. When the lid is opened, the second guide member is remotely positioned form the first guide member, thereby providing easy access to the band for replacement thereof.

11 Claims, 4 Drawing Sheets

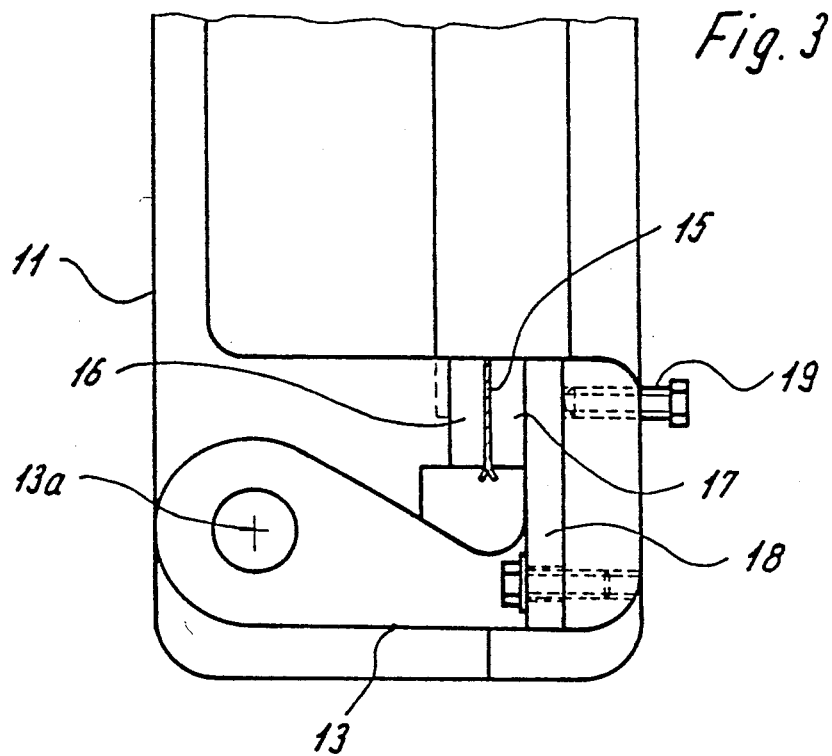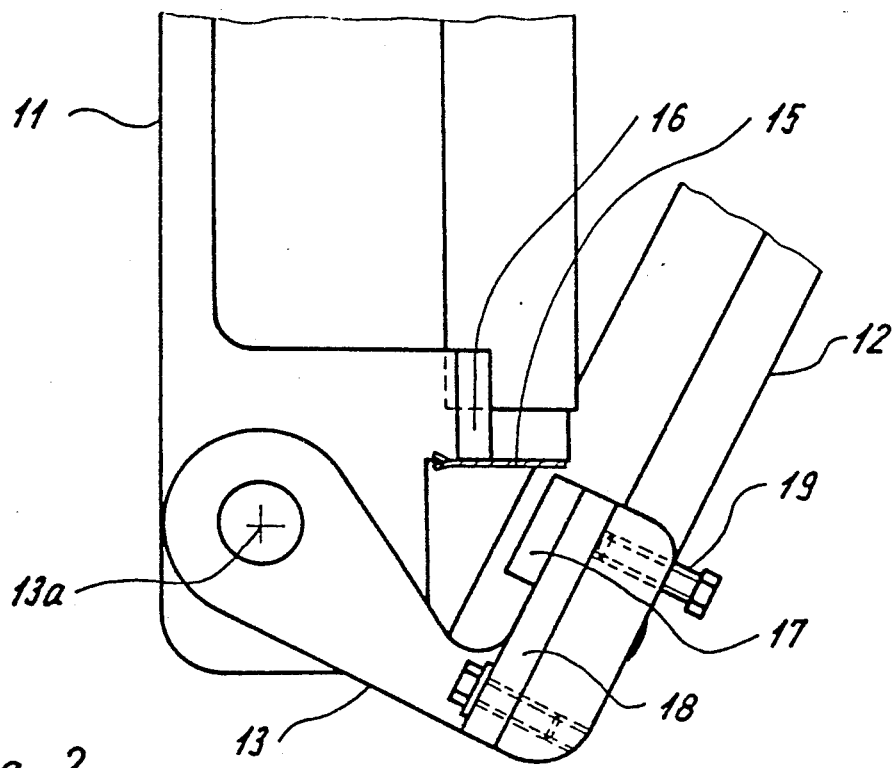

BAND SAW FOR CUTTING ANIMAL CARCASSES

BACKGROUND OF THE INVENTION

The present invention relates to a band saw for cutting animal carcasses and more particularly to an improved guide mechanism for the band which facilitates replacement of a band when it becomes worn or breaks.

BRIEF DESCRIPTION OF THE PRIOR ART

Band saws are customarily used in slaughterhouses for cutting up animal carcasses. The life of the belt or band of the saw is comparatively short so that it is necessary to replace the bands at relatively brief intervals. Because the cutting teeth of the saw band must lie forward in the direction of sawing, it is necessary to make sure that the cutting segment of the band is rotated by an angle of 90°. This rotation, which may be considered in terms of a twisting motion, takes place by virtue of correspondingly shaped, fixed guides that are so arranged with respect to each other that a gap is defined for the band to run therebetween. In order to operate the saw, it is necessary to pre-stress or tension the band.

A band saw of the type described above and known in the prior art is disclosed in DE-OS 37 30 730. In order to replace the belt or band in such a band saw, it is necessary first to relieve the stress on the old band. Next the old band must be removed from the pulleys of the saw and also withdrawn from between the guides. A new band is then inserted, first between the guides and then around the pulleys. Finally, the new band is tensioned by adjusting one of the pulleys. Replacement of a band, therefore, is a laborious and time-consuming—though necessary—endeavor.

Within a slaughterhouse, there are a number of band saws arranged along an assembly line, or more appropriately, a disassembly line. Owing to the large number of band saws in use, there are interruptions in operation because of the time needed to exchange the saw bands. The present invention was developed to improve a band saw of this type with a simple design so that the exchange of the saw belt or band will be considerably simplified and the required time will be so short that the continuous movement of the animal carcasses to be cut up in a slaughter assembly line will not be threatened.

SUMMARY OF THE INVENTION

In accordance with the invention, the band saw includes a housing having a pair of rotatable pulleys or rollers for supporting the band. A tension device is connected with a return pulley to tension the band, and a lid is pivotally connected with the housing for movement between open and closed positions. The guides for twisting the band are arranged adjacent the pulleys and define a cutting section of the band. Each guide includes a first guide member connected with the housing and a second guide member connected with the lid. The second guide member is arranged adjacent and spaced from the first guide member when the lid is in the closed position to define a gap for receiving the band. When the lid is in the open position, the second guide member is remotely positioned from the first guide member affording access to the bands to allow it to be replaced. Thus there is no need to pull the band out of the gap or insert a new band into the gap when changing a band. A band which is to be newly inserted is placed in its original form around the pulleys and twisting is accomplished almost automatically as a result of closing the lid which brings the second guide member adjacent the first guide member to define the gap.

The saw bands are comparatively thin. Thus, the width of the gap for twisting the band must be maintained in an extremely accurate fashion. This applies particularly when the surfaces of the guide members, which face each other, are made in a curved or spiral shape. To adjust the width of the gap, it is advantageous if the mobile guide member, which is placed on the lid, is fixed upon an elastically deformable intermediate plate that is arranged on the lid and which can be moved by means of an adjustment screw in relation to the fixed guide member.

The time needed to change the saw band is shortened even further if the device for tensioning the return pulley includes at least one hydraulic block that works against the action of a return spring and thus shifts the return pulley so that the hydraulic block can be activated by a ram including a toothed end. A pinion, which is rotatable as the lid is swung around a hinge axis, engages the toothed end of the ram. Upon the opening of the lid, the hydraulic block is released so that the return spring shifts the return pulley—reducing the axial interval between the pulleys—in the direction toward the other pulley so that the band is free of tension. Upon closing the lid, the return pulley is moved in the opposite direction so that the band is tensioned. By means of this design, the band is automatically tenioned or released.

When cutting up meat or animal carcasses, it is unavoidable that residue sticks to the band. This can lead to the accumulation of residues that would make the exchange of the saw band more difficult. To prevent this accumulation of residue, there are provided in front of the rear pulley, on both sides of the saw band, a scraper-finger that contacts the associated side surface of the saw band. The rear pulley is the one which, in the direction of movement of the cutting segment of the saw band, lies to the rear and is not adjustable.

BRIEF DESCRIPTION OF THE FIGURES

Other objects and advantages of the invention will become apparent from a study of the following specification when viewed in the light of the accompanying drawing, in which:

FIG. 2 is a partial top plan view of the saw with the lid open;

FIG. 3 is a partial top plan view of the saw with the lid closed;

DETAILED DESCRIPTION

Figure 1:
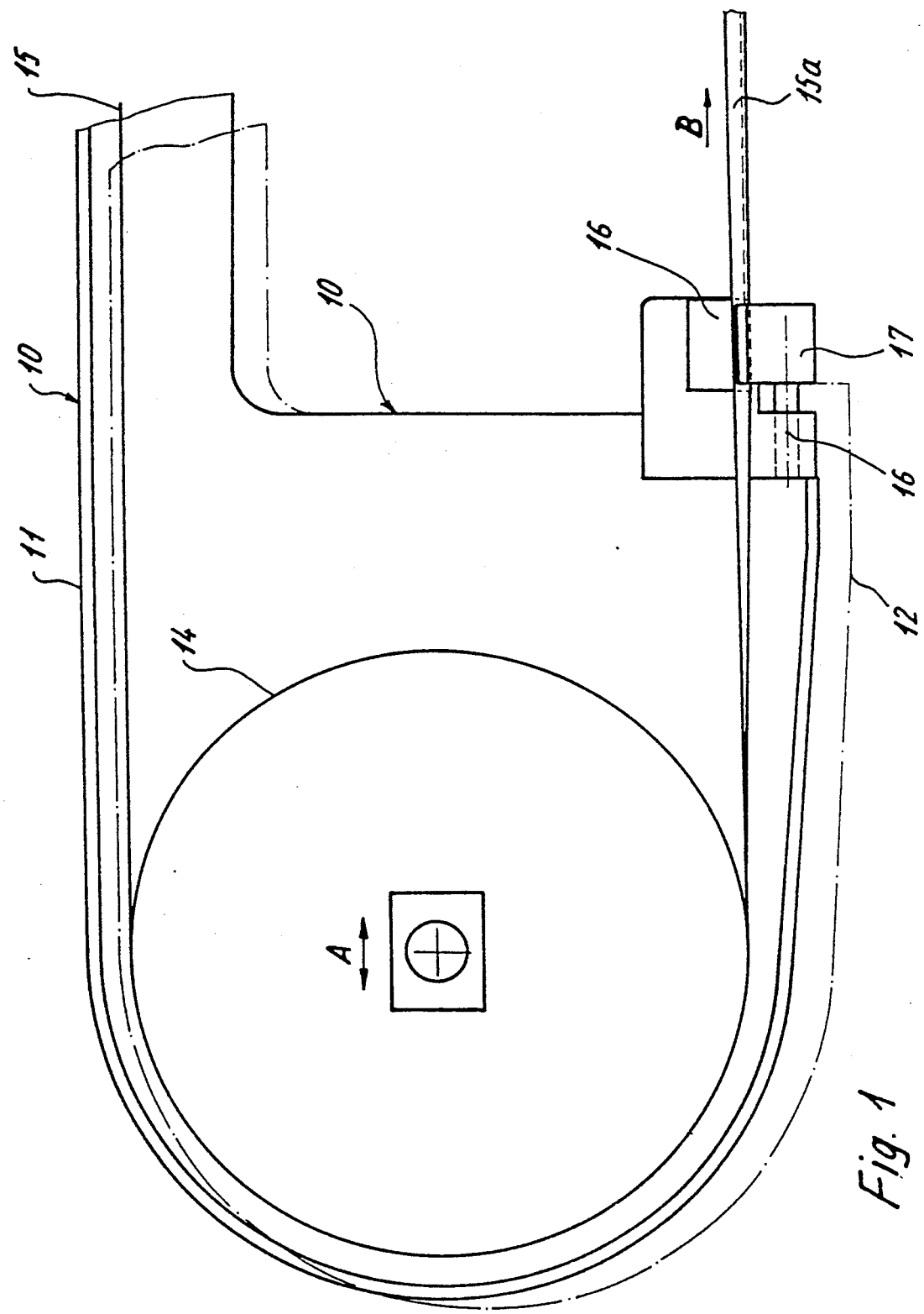
FIG. 1 is a partial side plan view of the band saw according to the invention.

The band saw 10 shown in the drawing comprises an open housing 11 which is closed by means of a lid 12. The lid is rotatably connected with the housing 11 by means of a hinge 13 having a hinge pin 13a. For reasons of illustration, as shown in FIG. 1, the lid 12 is indicated with dot-dash lines to show that inside the housing 11 there is rotatably positioned a return pulley 14—which can be shifted in the direction of the double arrow A—for a saw belt 15. Return pulley 14 is displaced by means of a tensioning device that will be described in greater detail below. A second pulley for the band is positioned for rotation in the housing and is not illustrated for the sake of simplicity. The direction of movement of the saw band 15 is indicated by arrow B.

At a comparatively short interval with respect to the return pulley 14 as well as to the other pulley which is not shown, there are provided band guides each including two guide members 16, 17 that turn the saw band 15 in a twisting motion by 90° so that the teeth in the illustration of FIG. 1 will be directed downwardly, as indicated by the broken line. The cutting segment 15a of the saw band 15 lies between the guides. FIGS. 1-3 show that one guide member 16 is attached in a fixed manner to the housing 11 while the other guide member 17, which lies on the outside, is fastened to the lid 12. The shape of the guide members 16, 17 is illustrated only in a schematic fashion because this shape is already known to those in the art. The surfaces of the guide members that lie facing each other are complementary with each other so that they run in the manner of a spiral.

FIG. 1 shows the utilization position of the band saw 10 with the lid 12 in the closed position, as also illustrated in FIG. 3. Lid 12 is rotated to the open position to exchange the saw band 15. The endless saw band 15 is then returned to its original untwisted shape owing to return forces so that the teeth of the saw band 15 will lie facing the bottom of the housing 11, as shown in FIG. 2. The old band can then be easily removed from the pulleys and a new band placed thereon. Guide member 17, which is fastened to the lid 12, is arranged so that, during closing of the lid, the outer edge will hit the edge that lies facing away from the teeth of the saw band 15. By closing the lid 12, the saw band 15 is twisted by 90°, as shown by the comparison of FIGS. 2 and 3.

To make sure that the gap formed between the guide members 16, 17 can be adjusted exactly to the thickness of the saw band 15, the guide member 17 is placed upon an elastic intermediate plate 18 which is connected with the lid at the side opposite the guide member 17. Lid 12, in the area associated with the guide member 17 includes an adjusting screw 19 which can be turned from the outside as a result of which—along with the deformation of the intermediate plate 18—the gap formed between the guide members 16, 17 can be adjusted.

Figure 4:
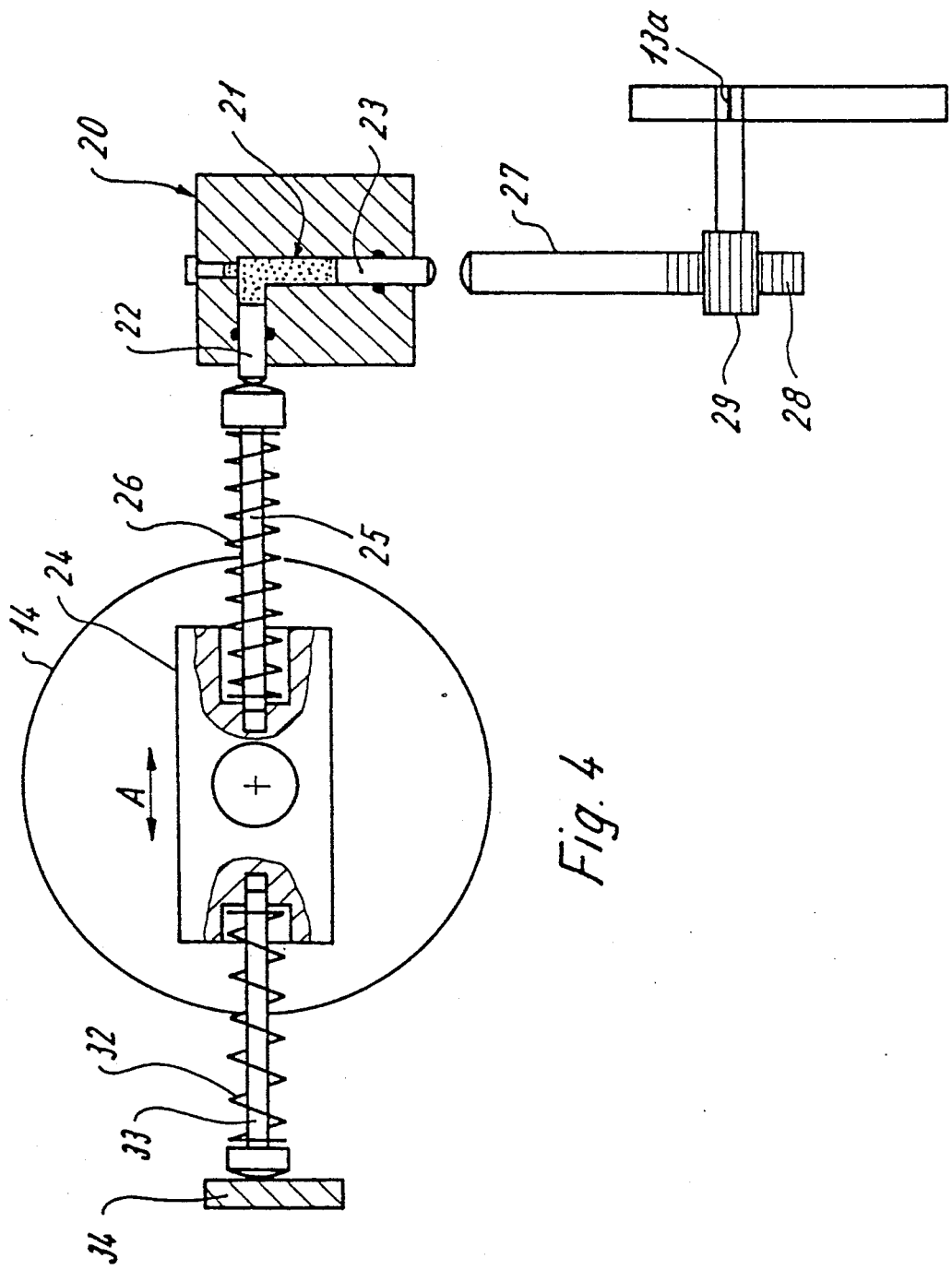
FIG. 4 is a detailed plan view of the adjustment mechanism for one of the pulleys for tensioning the band.

FIG. 4 shows the tensioning device for shifting the return pulley 14 in the direction of double arrow A in greater detail. The tensioning device includes a hydraulic block 20, which is firmly mounted in the housing 11 and which includes an L-shaped duct 21. In both legs of the duct 21, there are arranged movable pistons 22, 23, respectively, which are at a right angle with respect to each other. Duct 21 is filled in the intersection area of both legs with a hydraulic liquid that is prevented from flowing out of the duct 21 by means of the sealed pistons 22, 23. In all positions, the free front surfaces of the pistons 22, 23 protrude beyond the associated surfaces of the hydraulic block 20.

The return pulley 14 is rotatably positioned in a bearing block 24. Inserted in the bearing block 24 is a rod 25 which, at the side facing the hydraulic block 20, has a head with a larger diameter. A tension spring 26 is mounted about the rod 25, and is supported at one end on the bearing block 24 and at the other end on the ring-shaped surface formed by the head of the rod 25. The bearing block 24 contains a bore hole that is made in a stepped fashion, where the smaller part of the rotation axis lies facing the return pulley 14. The rod 25 is guided within the bore hole. Piston 23, which lies facing away from the rod 25, contacts a ram 27 aligned therewith and which has a toothed end 28. Engaging the teeth of the ram 27 is a pinion 29 which is rotated around the hinge pin 13a as the lid is rotated.

On the side facing away from the hydraulic block 20, there is provided another rod 33 that is aligned with the rod 25 and that receives a return spring 32. Bearing block 24 is provided with a stepped bore hole on the side facing away from the hydraulic block 20. The return spring 32 is supported against the ring-shaped surface of this bore hole. Rod 33 is guided in the other bore hole. At its free end, the rod 33 has a head which is constantly biased by the action of the return spring 32 against a fixed stop 34 which is attached to the housing.

During closing of the lid, the ram 27 pushes the piston 23 further into the hydraulic block 20 as a result of which the other piston 22 is further run out. Because the spring constant of the tension spring 26 is considerably greater than that of the return spring 32, the return pulley 14, the bearing block 24, the rod 25 and the tension spring 26—during the closing of the lid 12—are pushed so far to the left, as shown in the drawing, as is permitted by the band 15 that is placed on the return pulley 14. Because the shifting distance of the ram 27 or of the pistons 22, 23 depends on the angle of rotation of the lid 12, the piston 22 nevertheless is run out further because the rod 25 can be relatively shifted with respect to the pulley 14 since the bore hole in the bearing block 24 is correspondingly deep. The tension spring 26 is stressed even more as the piston 22 is run out even further. Tensioning of the band 15 is provided, with the lid closed by the tension spring 26. By shifting the return pulley 14, return spring 32 is also tensioned more strongly. As the lid 12 is rotated to the open position, pistons 22, 23 move in the opposite direction so that the tension spring 26 is relieved in terms of stress and so the rod 25 will move in the direction toward the hydraulic block 20. By virtue of the return spring 32, the bearing block 24 and the return pulley 14 are also moved in the direction toward the hydraulic block 20 so that the saw band 15 is freed of tension. The shifting distance is so designed that the band 15 which is to be replaced can be pulled down and off of the return pulleys 14 without any problem.

Figure 5:
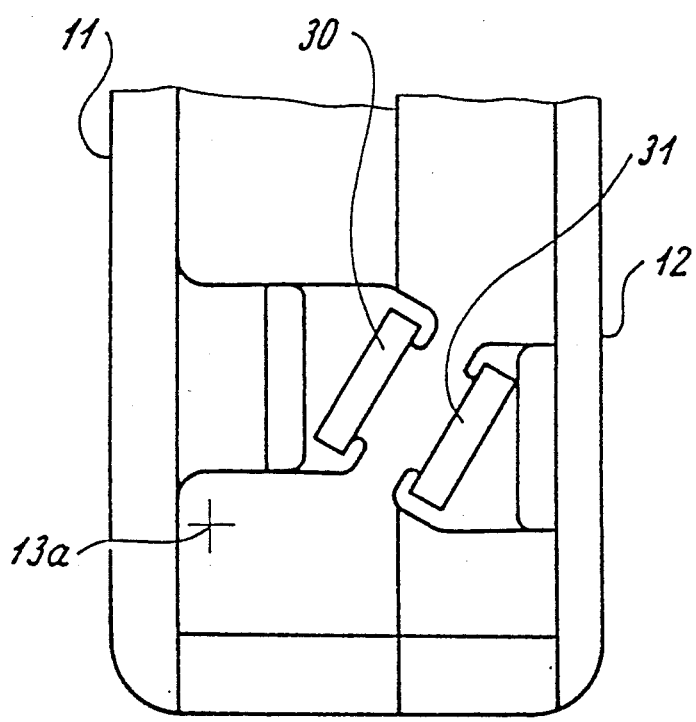
FIGS. 5 and 6 are side and end views, respectively, of the scraping blades for cleaning the band.
Figure 6:
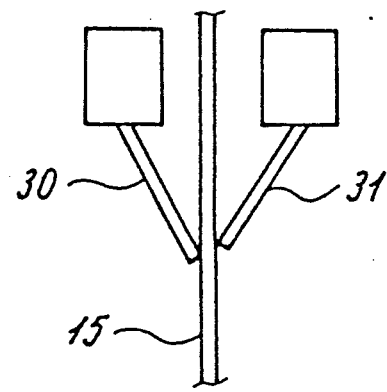

Referring now to FIGS. 5 and 6, there are shown two scraping fingers 30, 31 whose free ends engage the sides of the band 15 to remove particles of meat or other debris which adheres to the band following cutting. The scraping fingers are formed as spring blades which are chucked unilaterally. The fingers are arranged adjacent the band between the guide members and the return pulley.

As shown in FIG. 5, the two scraping fingers 30, 31 are inclined with respect to a vertical plane because the saw band 15 is at an incline. FIG. 5 also shows that one scraping finger 30, as can be seen in the drawing, is fixed upon the housing 11, while the other scraping finger 31 is fastened on the movable lid 12. Because the fingers are elastic, they are so deformed with the lid 12 closed that they are pressed against the saw band 15 with a certain pressing force so that the cleaning effect is always achieved. FIG. 6 illustrates that the scraping fingers 30, 31 have a finite length and that acute angles are formed between the scraping fingers and the saw band 15. Since the fingers are flexible, they can always adapt to the position of the saw band.

With the band saw according the invention, opening of the lid automatically releases the tension on the band and simultaneously affords access to the band within the gap, whereby replacement of a used band is quickly and easily accomplished. When the lid is closed, the band is tensioned and the guide parts come together to twist the band so that the band saw is ready for use. The total down time is relatively insignificant, which is acceptable in a slaughter assembly line.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A band saw for cutting animal carcasses and the like, comprising
   (a) a housing including a fixed rotatable pulley and a displaceable rotatable pulley for supporting the band;
   (b) a lid pivotally connected with said housing for movement between open and closed positions;
   (c) means connected with said housing for displacing said displaceable pulley for tensioning the band when said lid is pivoted to the closed position; and
   (d) guide means arranged adjacent to said pulleys for twisting the band, each of said guide means including:
      (1) a first guide member connected with said housing; and
      (2) a second guide member adjustably connected with said lid via an adjustable plate, said second guide member being arranged adjacent and space from said first guide member when said lid is in the closed position to define a gap for receiving the band, the thickness of the gap being adjusted by operation of said adjustable plate, said first guide member of said guide means arranged adjacent to said displaceable pulley being connected with a bearing block thereof for displacing said displaceable pulley and tensioning the band when said lid is pivoted to the closed position, whereby when the lid is in the open position, the band is detensioned and the second guide members are remotely positioned from the first guide members to allow the band to be replaced.

2. Apparatus as defined in claim 1, and further comprising scraping fingers on both sides of the band following a cutting section thereof, said fingers contacting the side surfaces of the belt, respectively, for removing residue therefrom following cutting.

3. Apparatus as defined in claim 2, wherein said scraping fingers comprise spring blades which are chucked unilaterally.

4. Apparatus as defined in claim 2, wherein one scraping finger is connected with said housing and the other scraping finger is connected with said lid.

5. Apparatus as defined in claim 2, wherein said scraping fingers are inclined with respect to a vertical plane.

6. Apparatus as defined in claim 2, wherein said scraping fingers are arranged at an acute angle with respect to the band.

7. A band saw for cutting animal carcasses and the like, comprising
   (a) a housing including a fixed rotatable pulley and a displaceable rotatable pulley for supporting the band;
   (b) a lid pivotally connected with said housing for movement between open and closed positions;
   (c) means connected with said housing for displacing said displaceable pulley for tensioning the band, said displacing means including at least one hydraulic block for displacing said displaceable pulley against the force of a return spring, said block being actuated by a ram having a toothed end connected with a pinion which is driven upon movement of said lid to the closed position; and
   (d) guide means arranged adjacent to said pulleys for twisting the band, each of said guide means including
      (1) a first guide member connected with said housing; and
      (2) a second guide member adjustably connected with said lid via an adjustable plate, said second guide member being arranged adjacent and spaced from said first guide member when said lid is in the closed position to define a gap for receiving the band, the thickness of the gap being adjusted by operation of said adjustable plate, said first guide member of said guide means arranged adjacent to said displaceable pulley being connected with a bearing block thereof, whereby when the lid is in the open position, the second guide members are remotely positioned from the first guide members too allow the band to be replaced.

8. Apparatus as defined in claim 7, wherein said hydraulic block contains an L-shaped duct containing hydraulic fluid and a piston in each leg thereof, one of said pistons being aligned with said ram.

9. Apparatus as defined in claim 7, wherein said displaceable pulley is rotatably mounted in a bearing block having first and second aligned rods arranged on opposite sides thereof, said first rod having a return spring mounted thereon and said second rod having a tension spring mounted thereon, said second rod facing said hydraulic block.

10. Apparatus as defined in claim 9, wherein said first rod includes a free end braced against a fixed stop.

11. Apparatus as defined in claim 9, wherein the spring constant of said tension spring is greater than that of said return spring.

* * * * *